(12) United States Patent
Gerard et al.

(10) Patent No.: US 9,060,195 B2
(45) Date of Patent: Jun. 16, 2015

(54) TELEVISION ADVERTISING MESSAGE TARGETING ACCORDING TO SUBSCRIBER PURCHASING BEHAVIOR

(71) Applicant: MASTERCARD INTERNATIONAL CORPORATION, Purchase, NY (US)

(72) Inventors: Jean-Pierre Gerard, Croton On Hudson, NY (US); Po Hu, Norwalk, CT (US)

(73) Assignee: MasterCard International Incorporated, Purchase, NY (US)

( * ) Notice: Subject to any disclaimer, the term of this patent is extended or adjusted under 35 U.S.C. 154(b) by 87 days.

(21) Appl. No.: 14/043,518

(22) Filed: Oct. 1, 2013

(65) Prior Publication Data

US 2015/0095944 A1    Apr. 2, 2015

(51) Int. Cl.
*H04N 7/10* (2006.01)
*H04N 7/025* (2006.01)
*H04N 21/2668* (2011.01)
*H04N 21/81* (2011.01)
*H04N 21/2543* (2011.01)

(52) U.S. Cl.
CPC ......... *H04N 21/2668* (2013.01); *H04N 21/812* (2013.01); *H04N 21/2543* (2013.01)

(58) Field of Classification Search
CPC .......... H04N 21/2668; H04N 21/4667; H04N 21/6582; H04N 21/812; H04N 21/2408; H04N 21/47815; G06Q 30/0251; G06Q 30/02; G06Q 30/0269; G06Q 30/0241; G06Q 30/06
USPC .............. 725/32, 34, 36, 42; 705/14.4, 14.41, 705/14.46, 14.49, 14.51, 14.52, 14.67, 705/26.42

See application file for complete search history.

(56) References Cited

U.S. PATENT DOCUMENTS

| | | |
|---|---|---|
| 6,177,937 B1 * | 1/2001 | Stockham et al. ............ 715/807 |
| 6,463,585 B1 | 10/2002 | Hendricks et al. |
| 7,328,448 B2 | 2/2008 | Eldering et al. |
| 7,475,813 B2 | 1/2009 | Swanson, Sr. |
| 7,703,114 B2 | 4/2010 | Thukral |
| 7,707,106 B1 | 4/2010 | Swanson, Sr. et al. |
| 7,844,985 B2 | 11/2010 | Hendricks et al. |
| 7,861,260 B2 | 12/2010 | Shkedi |
| 8,051,444 B2 | 11/2011 | Shkedi |
| 8,255,949 B1 | 8/2012 | Bayer et al. |
| 8,281,336 B2 | 10/2012 | Shkedi |
| 8,327,399 B2 | 12/2012 | Noll et al. |
| 8,365,213 B1 | 1/2013 | Orlowski |
| 2002/0073034 A1 | 6/2002 | Wagner et al. |
| 2002/0073421 A1 | 6/2002 | Levitan et al. |

(Continued)

OTHER PUBLICATIONS

Clifford, "Cable Companies Target Commercials to Audience," New York Times, Mar. 3, 2009, accessed on Dec. 4, 2013 at http://www.nytimes.com/2009/03/04/business/04cable.html, 3 pages.

(Continued)

*Primary Examiner* — Oleg Asanbayev
(74) *Attorney, Agent, or Firm* — Ballard Spahr LLP

(57) ABSTRACT

A targeted television advertising system includes a modeling processor and an identification processor. The modeling processor is configured to model purchasing behavior of a selected television service subscriber using a payment card transaction database. The identification processor is configured to identify television advertising messages that may appeal to the selected television service subscriber based upon the modeled purchasing behavior.

11 Claims, 3 Drawing Sheets

(56) References Cited

U.S. PATENT DOCUMENTS

| | | | |
|---|---|---|---|
| 2002/0083443 | A1 | 6/2002 | Eldering et al. |
| 2002/0104083 | A1 | 8/2002 | Hendricks et al. |
| 2003/0018969 | A1 | 1/2003 | Humpleman et al. |
| 2003/0093792 | A1 | 5/2003 | Labeeb et al. |
| 2003/0101449 | A1 | 5/2003 | Bentolila et al. |
| 2003/0145323 | A1 | 7/2003 | Hendricks et al. |
| 2005/0165638 | A1 | 7/2005 | Piller |
| 2005/0177423 | A1 | 8/2005 | Swanson |
| 2005/0234769 | A1 | 10/2005 | Jain et al. |
| 2006/0195866 | A1 | 8/2006 | Thukral |
| 2007/0136162 | A1 | 6/2007 | Thibodeau et al. |
| 2008/0004954 | A1* | 1/2008 | Horvitz ............... 705/14 |
| 2008/0060002 | A1 | 3/2008 | Noll et al. |
| 2008/0109376 | A1 | 5/2008 | Walsh et al. |
| 2008/0259906 | A1 | 10/2008 | Shkedi |
| 2009/0049468 | A1 | 2/2009 | Shkedi |
| 2009/0049469 | A1 | 2/2009 | Small et al. |
| 2009/0172728 | A1 | 7/2009 | Shkedi et al. |
| 2009/0217319 | A1 | 8/2009 | Weiss |
| 2009/0299843 | A1 | 12/2009 | Shkedi |
| 2009/0300675 | A1 | 12/2009 | Shkedi |
| 2010/0301114 | A1* | 12/2010 | Lo Faro et al. ............ 235/380 |
| 2010/0313218 | A1 | 12/2010 | Niemeijer et al. |
| 2010/0325659 | A1 | 12/2010 | Shkedi |
| 2011/0302613 | A1* | 12/2011 | Joshi ............... 725/60 |
| 2012/0017240 | A1 | 1/2012 | Shkedi |
| 2012/0047530 | A1 | 2/2012 | Shkedi |
| 2012/0192222 | A1 | 7/2012 | Kumar et al. |
| 2012/0216224 | A1 | 8/2012 | Rajagopal et al. |
| 2012/0304208 | A1 | 11/2012 | McWilliams |
| 2013/0036434 | A1 | 2/2013 | Shkedi et al. |

OTHER PUBLICATIONS

Deloitte, "Targeted television advertisements miss the point," Deloitte Global Services Limited, 2012, accessed on Dec. 4, 2013 at https://www.deloitte.com/assets/Dcom-Global/Local%20Content/Articles/TMT/TMT%20Predictions%202012/16470A%20Targeted%201bl.pdf, 3 pages.

DMS Retail, "Retail store categories based on NAICS classification system," DMSRetail.com, accessed on Dec. 4, 2013 at http://www.dmsretail.com/storecats.htm, 2 pages.

Heine, Nielsen Uses TV and Web Data in New Targeting Effort, AdWeek, Aug. 7, 2012, accessed on Dec. 4, 2013 at http://www.adweek.com/news/technology/nielsen-uses-tv-and-web-data-new-targeting-effort-142562, 2 pages.

National Retail Federation, "NAICS Definition of Retail Categories," National Retail Federation, 2009, accessed on Dec. 4, 2013 at http://www.nrf.com/modules.php?name=Pages&sp_id=1289&op=printfriendly&txt=National+Retail+Federation++-+NAICS+Definition+of+Retail+Categories, 2 pages.

Prater, "What electronic payments reveal about you to lenders: Your credit card is a tattletale, telling creditors about your behavior," creditcards.com, Jan. 13, 2009, accessed on Dec. 4, 2013 at http://www.creditcards.com/credit-card-news/credit-card-purchase-privacy-1282.php, 5 pages.

US Government, "Electronic Code of Federal Regulations," Title 12: Banks and Banking, Part 216-Privacy of Consumer Financial Information (Regulation P), accessed on Dec. 4, 2013 at www.ecfr.gov, 38 pages.

Visa, "Visa Commercial Solutions: Merchant Category Codes for IRS Form 1099-MISC Reporting," Visa USA, Inc., internal memo, 15 pages.

* cited by examiner

TELEVISION ADVERTISING MESSAGE TARGETING ACCORDING TO SUBSCRIBER PURCHASING BEHAVIOR

BACKGROUND

1. Field of the Disclosure

The present disclosure relates generally to the field of television advertising message targeting, and more particularly to systems, methods and computer program products that select television advertising messages for targeting according to modeled payment card purchasing behavior of a television service subscriber.

2. Description of the Related Art

Currently, television advertising is simply broadcast along with content. Advertisers make judgments that their good or services are more likely to be purchased by viewers of certain types of programs rather than others. For example, brewing companies determine that people who watch football are likely to buy beer. Accordingly, brewing companies buy advertising on televised football games rather than, for example, televised operas. However, a significant number of football fans may never purchase beer, and a significant number of opera fans may like beer.

Advertisers want their ads to be effective in terms of influencing television viewers to buy their goods or services. However, many viewers may not have any interest in much of the broadcast advertising messages. When watching live programs, such viewers may ignore the ads or even leave the room during the commercial breaks. With the advent of the digital video recorder (DVR) many viewers like to record a program for later viewing. If the viewer knows that he or she is not likely to be interested in the ads run with recorded content, the viewer may fast-forward through the ads. Accordingly, broadcast television advertising may not be as effective as the sponsors would like.

Payment card service providers collect transaction data for their cardholders. Payment card service providers can mine that data to obtain a fairly clear picture of a cardholder's purchasing behavior. However, federal privacy laws, such as Federal Reserve Regulation P, prohibit payment card issuers and service providers from sharing transaction information with third parties, such as advertisers and television service providers.

SUMMARY

Embodiments include methods, systems, and computer-readable media that enable the delivery of targeted television advertising based upon modeled payment card purchasing behavior.

In one aspect, a method of delivering targeted television advertising uses a processor to model purchasing behavior of a selected television service subscriber using a payment card transaction database. The method uses the processor to identify television advertising messages that may appeal to the selected television service subscriber based upon the modeled purchasing behavior.

In another aspect, a targeted television advertising delivery system includes a modeling processor configured to model purchasing behavior of a selected television service subscriber using a payment card transaction database. An identification processor is configured to identify television advertising messages that may appeal to the selected television service subscriber based upon the modeled purchasing behavior.

In another aspect, a non-transitory computer-readable storage medium is encoded with data and instructions, which when executed by a computing device, the instructions cause the computing device to model purchasing behavior of a selected television service subscriber using a payment card transaction database. The instructions cause the computing device to identify television advertising messages that may appeal to the selected television service subscriber based upon the modeled purchasing behavior.

BRIEF DESCRIPTION OF THE DRAWINGS

The disclosure will best be understood by reference to the following detailed description of an illustrative embodiment when read in conjunction with the accompanying drawings, where.

DETAILED DESCRIPTION

Figure 1:
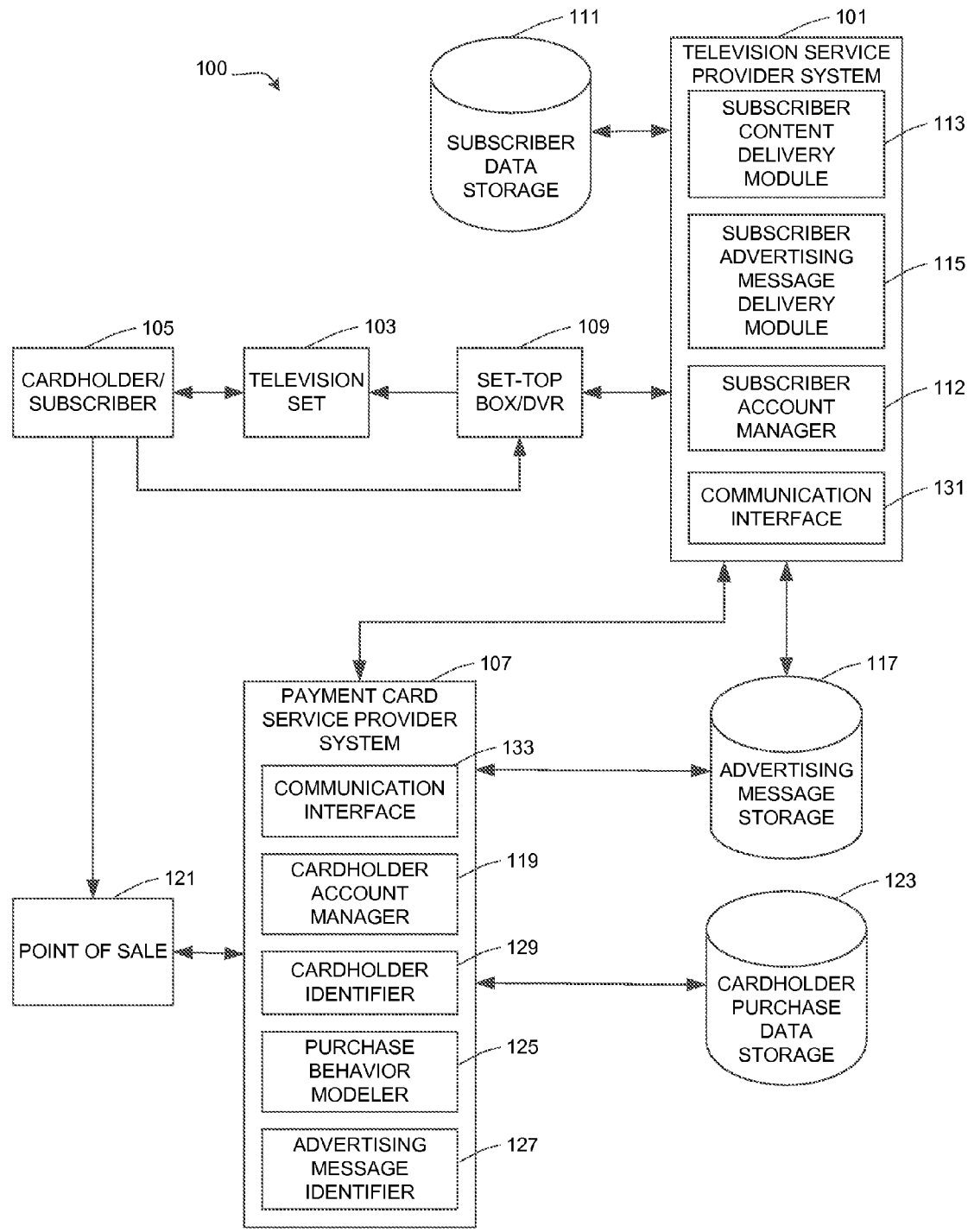
FIG. 1 is a block diagram of an embodiment of a targeted television advertising delivery system.

Referring now to the drawings, and first to FIG. 1, an embodiment targeted television advertising delivery system is designated generally by the numeral 100. System 100 includes a television service provider system 101, which provides television service to a television set 103 associated with a cardholder/subscriber 105. Cardholder/subscriber 105 is a person in whose name an account with television service provider 101 is associated. Cardholder/subscriber also has a payment card issued by a financial institution affiliated with a payment card service provider system 107.

Television service provider system 101 can be a cable or satellite television or the like television service provider. Television service provider system 101 provides television content to television set 103 via cable, satellite, or the like, according to a subscription agreement with cardholder/subscriber 105. Television service provider system 101 includes a subscriber account manager 112, which manages accounts with subscribers, such as cardholder/subscriber 105. Television service provider system 101 stores cardholder/subscriber information, such as account and advertising message information in a subscriber data storage 111.

Television service provider system 101 includes a subscriber content module 113, which delivers television content to television set 103 in accordance with the subscription agreement with cardholder/subscriber 105. Television service provider system 101 can transmit content to television set 103 through a set-top box 109, such as a satellite receiver, cable box, or the like, which may include a built-in digital video recorder (DVR). Television service provider system 101 also includes subscriber advertising message delivery module 115, transmits to television set 103 advertising messages inserted into commercial television content. Advertising messages are stored in advertising message storage 117. Television service provider 101 can stream the advertising messages to television set 103 with the content or download selected advertising messages to set-top box/DVR 109, which can be programmed to insert selected advertising messages at appropriate places in the content. Cardholder/subscriber 105 interacts with television set 103 and/or set-top box/DVR to view television content and/or advertising messages.

Payment card service provider system 107 includes a cardholder account manager 119, which receives payment card transaction information from a point of sale, indicated generally at 121. Point of sale 121 includes all entities to which cardholder/subscriber 105 pays money using his or her payment card for the purchase of goods or services. Cardholder account manager 119 stores transaction information associated with cardholder/subscriber 105 in cardholder purchase data storage 123. The transaction information includes the date, time and amount of the purchase, and the identity and location of the entity from whom the goods or services were purchased. Account manager 119 may also include with the transaction information purchase category information, such as a merchant category code (MCC). An MCC is a four digit code that categorizes the type of entity that provided the goods of services in exchange for the payment card payment.

Payment card service provider system 107 includes a purchase behavior modeler 125, which models the purchasing behavior cardholders, including cardholder/subscriber 105. Purchase behavior modeler 125 uses transaction information stored in cardholder purchase data storage 123 to define a picture of how and where cardholder/subscriber 105 uses his or her payment card. In addition to listing the categories and specific entities where cardholder/subscriber 105 makes a purchase, purchase behavior modeler 125 can make inferences about the preferences, financial condition, propensities, proclivities and the like of cardholder/subscriber 105. Payment card service provider system 107 stores the purchasing behavior model for cardholder/subscriber 105 in cardholder purchase data storage 123.

Payment card service provider system 107 includes an advertising message identifier 127, which uses the purchasing behavior modeled by purchase behavior modeler 125 to select from advertising message storage 117 advertising messages that would be likely to appeal to cardholder/subscriber 105. For example, the purchasing model may include specific entities, such as retail stores or airlines, that cardholder/subscriber 105 uses. Advertising message identifier 127 can select advertising messages for those specific entities. Advertising message identifier 127 can also select advertising messages based upon inferences about cardholder/subscriber 105. For example, Advertising message identifier 127 can select messages from entities that cardholder/subscriber 105 may not have dealt with, but who offer goods or services the cardholder/subscriber 105 would be likely to want or need. As will be described in detail hereinafter, payment card service provider system 107 periodically updates the purchase behavior model for cardholder/subscriber 105 to evaluate the effectiveness the selected advertising messages in influencing the purchasing behavior of cardholder/subscriber 105 and to tailor further the selected advertising messages. Payment card service provider system 127 may update the purchase behavior model on a time schedule, for example monthly, weekly or daily, and/or as advertising messages are added to or deleted from advertising message storage 117.

Payment card service provider system 107 includes a cardholder identifier 129 that identifies a specific subscriber, such as cardholder/subscriber 105, associated with television service provider system 101. Television service provider system 101 and payment card service provider system 107 communicate with each other through communication interfaces 131 and 133, respectively. In cases where cardholder/subscriber 105 pays his or her television service bill using a payment card affiliated with payment card service provider system 107, television service provider system 101 provides anonymous transaction information to payment card service provider system 107. The anonymous transaction information may include one or more of the date, time and amount of a television service subscription payment with an anonymous identifier that television service provider system 101 has associated with cardholder/subscriber 105. In the illustrated embodiment, cardholder identifier 129 searches cardholder purchase data storage 123 to locate the payment by date, time and amount. Cardholder identifier 129 then associates the anonymous identifier provided by television service provider system 101 with cardholder/subscriber 105. Payment card service provider system 107 can then provide to television service provider system 101 the identities of the advertising messages selected for cardholder/subscriber 105 without revealing confidential transaction or financial information.

Figure 2:
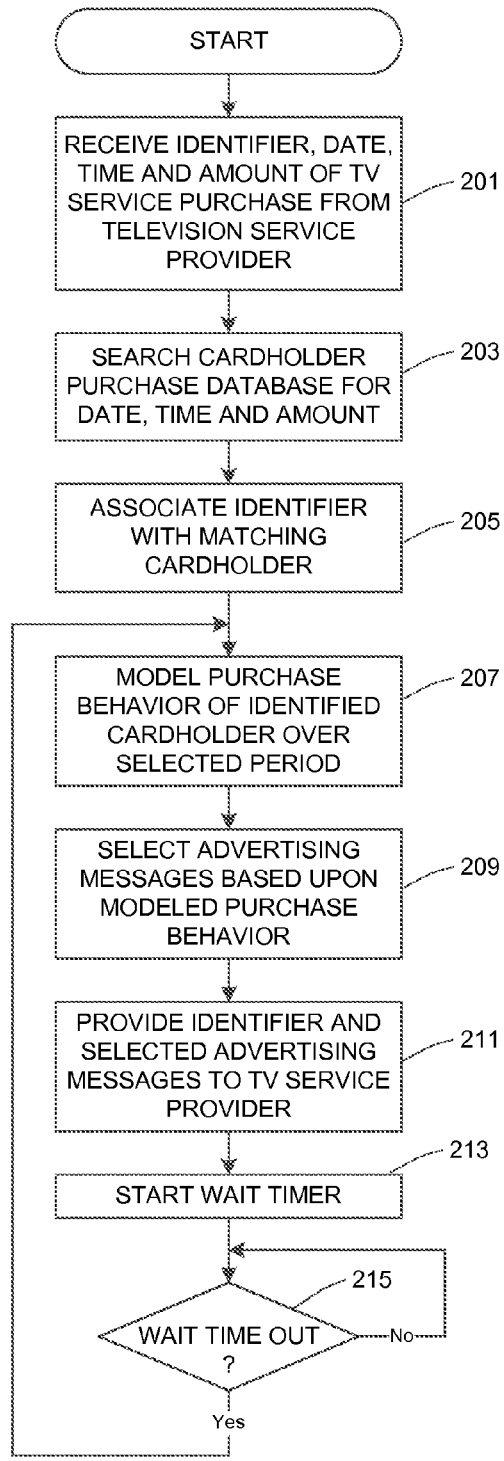
FIG. 2 is a flowchart of an embodiment of payment card service provider processing.

FIG. 2 is a high level flowchart of an embodiment of payment card service provider system 107 processing. Payment card service provider system 107 receives an anonymous identifier, date, time and amount of a television service purchase from television service provider system 101, as indicated at block 201. Payment card service provider system 107 searches cardholder purchase data storage 123 for the identified purchase transaction, at block 203, and associates the anonymous identifier with the matching cardholder, at block 205. Payment card service provider system 107 then models the purchasing behavior of the identified cardholder over a selected period, as indicated at block 207. The selected period may be, for example, the preceding six months. After modeling the purchasing behavior, payment card service provider system 107 selects advertising messages from advertising message database 117, as indicated at block 209, and provides the identities of the selected advertising messages with the anonymous identifier to television service provider system 101, as indicated at block 211. Payment card service provider system 107 then starts a wait timer, as indicated at block 213. The wait timer may be set for one month, for example. When, as determined at decision block 215, the wait timer times out, processing returns to block 207. Thus, in the embodiment of FIG. 2, payment card service provider system 107 provides advertising message selections to television service provider system 101 monthly based upon modeled purchasing behavior over the preceding six months or another time frame.

Those skilled in the art will recognize that updated advertising message selections may be provided on different bases. For example, the selections may be updated as old messages are deleted from and new messages are added to advertising message storage 117.

Figure 3:
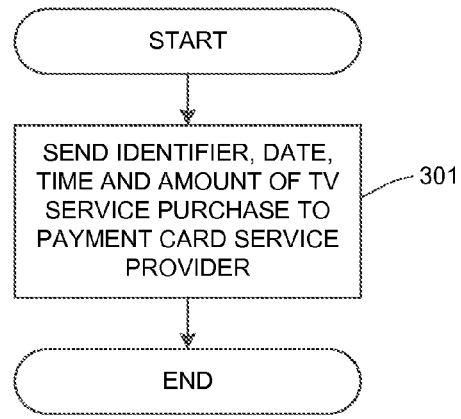
FIG. 3 is a flowchart of an embodiment of television service provider subscriber identification processing.
Figure 4:
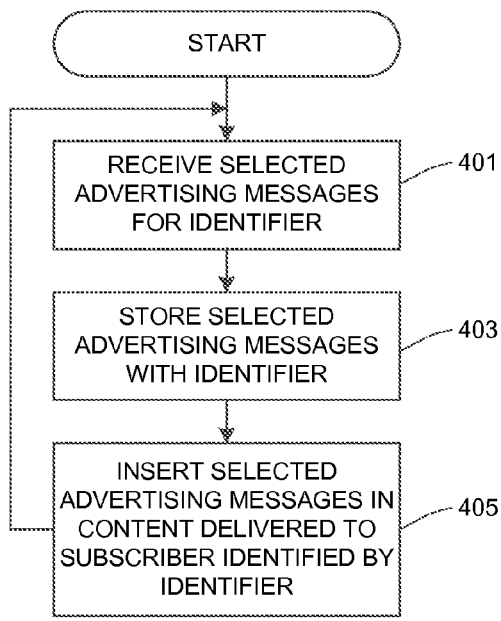
FIG. 4 is a flowchart of an embodiment of television service provider targeted advertising delivery processing; and, FIG. 5 is a block diagram of a computing device in which embodiments of the present disclosure may be implemented.

FIGS. 3 and 4 are high level flow charts of embodiments of television service provider system 101 processing. Referring first to FIG. 3, television service provider system 101 sends the anonymous identifier and the date, time and amount of the television service purchase to payment card service provider system 107, as indicated at block 301. Referring to FIG. 4, television service provider system 101 receives the identities of the advertising messages selected for the subscriber identified by the anonymous identifier, at block 401, and stores the identified advertising messages in association with the anonymous identifier, at block 403. Then, television service provider system 101 inserts the selected advertising messages into the content delivered to the subscriber identified by the anonymous identifier, at block 405. Processing according to FIG. 4 repeats, for example, whenever payment card service provider system 107 send updated advertising messages selections to television service provider system 101.

Figure 5:
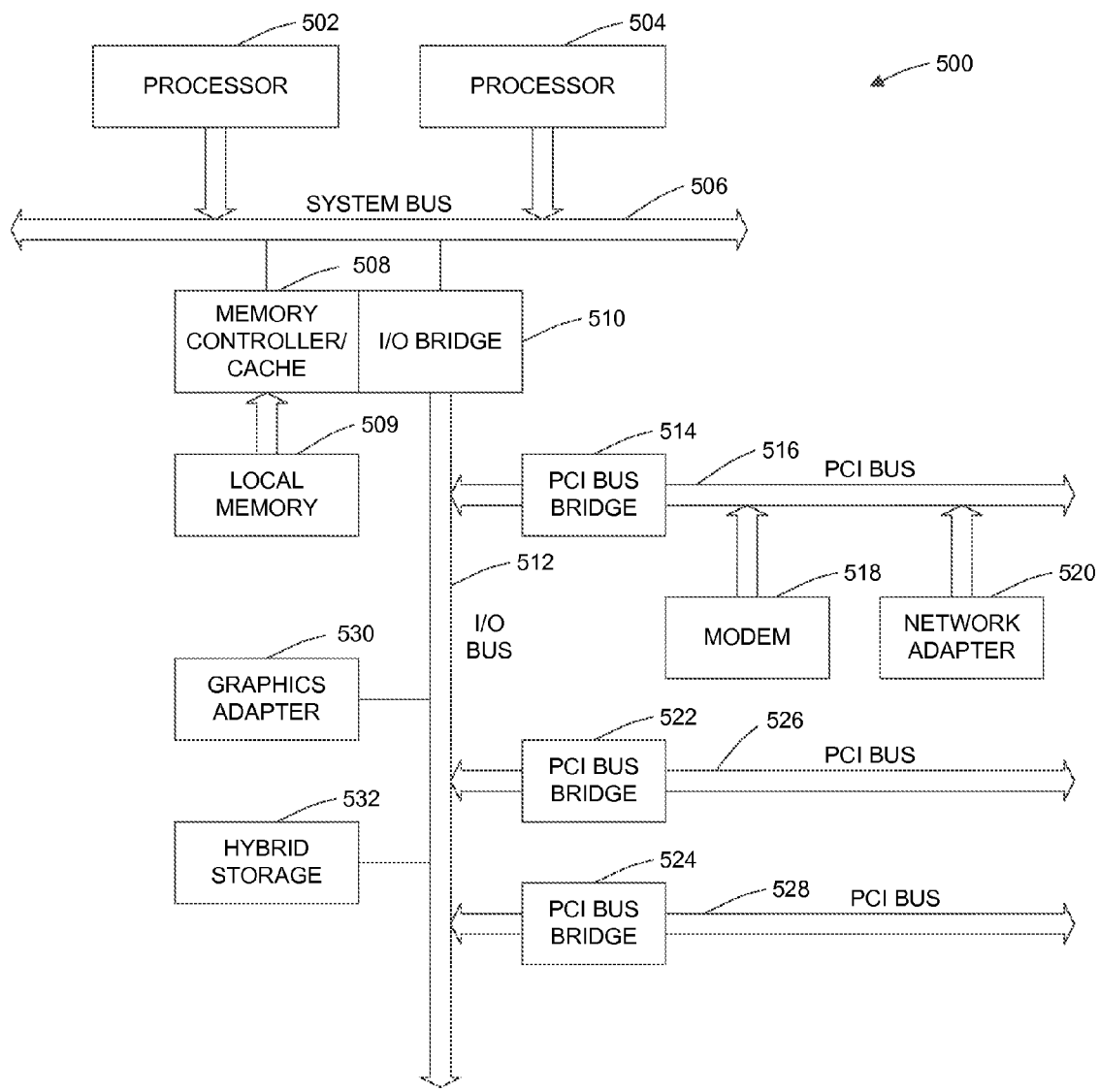

FIG. 5 is a block diagram of a data processing system upon which embodiments of the present disclosure may be implemented. Data processing system 500 may be a symmetric multiprocessor (SMP) system including a plurality of processors 502 and 504 connected to system bus 506. Alternatively, a single processor system may be employed. Also connected to system bus 506 is memory controller/cache 508, which provides an interface to local memory 509. I/O bus bridge 510 is connected to system bus 506 and provides an interface to I/O bus 512. Memory controller/cache 508 and I/O bus bridge 510 may be integrated as depicted.

Peripheral component interconnect (PCI) bus bridge 514 connected to I/O bus 512 provides an interface to PCI local bus 516. A number of modems may be connected to PCI local bus 516. Typical PCI bus implementations will support four PCI expansion slots or add-in connectors. Communications links to networks may be provided through a modem 518 or a network adapter 520 connected to PCI local bus 516 through add-in boards. Additional PCI bus bridges 522 and 524 provide interfaces for additional PCI local buses 526 and 528, respectively, from which additional modems or network adapters may be supported. In this manner, data processing system 500 allows connections to multiple network computers. A memory-mapped graphics adapter 530 and hybrid storage 532 may also be connected to I/O bus 512 as depicted, either directly or indirectly.

Those of ordinary skill in the art will appreciate that the hardware depicted in FIG. 5 may vary. For example, other peripheral devices, such as optical disk drives and the like, also may be used in addition to or in place of the hardware depicted. The depicted example is not meant to imply architectural limitations with respect to the present disclosure.

The data processing system depicted in FIG. 5 may be, for example, an IBM® eServer™ pSeries system, a product of International Business Machines Corporation in Armonk, N.Y., running the Advanced Interactive Executive (AIX™) operating system or LINUX operating system.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable storage medium or media having computer readable program code embodied thereon.

Any combination of one or more computer readable storage medium or media may be utilized. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof, A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The computer program instructions comprising the program code for carrying out aspects of the present disclosure may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable storage medium that can direct a computer, other programmable data processing apparatus, or other devices to function in a particular manner, such that the instructions stored in the computer readable medium produce an article of manufacture including instructions which implement the function/act specified in the foregoing flowchart and/or block diagram block or blocks.

The computer program instructions may also be loaded onto a computer, other programmable data processing apparatus, or other devices to cause a series of operations to be performed on the computer, other programmable apparatus or other devices to produce a computer implemented process such that the instructions which execute on the computer or other programmable apparatus provide processes for implementing the functions/acts specified in the foregoing flowchart and/or block diagram block or blocks.

The flowcharts and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, processes, operations, elements, and/or components, but do not preclude the presence or addition of one or more other features, integers, processes, operations, elements, components, and/or groups thereof.

The corresponding structures, materials, acts, and equivalents of all elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

From the foregoing, it will be apparent to those skilled in the art that systems and methods according to the present disclosure are well adapted to overcome the shortcomings of the prior art. While the present disclosure has been described with reference to the above embodiments, those skilled in the art, given the benefit of the foregoing description, will recognize alternative embodiments. Accordingly, the foregoing description is intended for purposes of illustration and not of limitation.

What is claimed is:

1. A method of delivering targeted television advertising, comprising:
    modeling purchasing behavior of a selected television service subscriber using a payment card transaction database with a processor;
    identifying television advertising messages that may appeal to the selected television service subscriber based upon the modeled purchasing behavior with the processor;
    wherein the modeling further includes:
    receiving from a television service provider payment card transaction information for the selected television service subscriber via a communication interface;
    searching the payment card transaction database to identify the selected television service subscriber based upon the received transaction information with the processor;
    searching the payment card transaction database for credit card purchase transactions made by the selected television service subscriber with the processor;
    wherein the payment card transaction information received from the television service provider further includes an identifier for the selected television service subscriber and transaction date, time and amount for a purchase of television service; and
    wherein the television service provider payment card transaction information for the selected television service subscriber received from the television service provider is anonymous.

2. The method as claimed in claim 1, further comprising: notifying the television service provider of the identified advertising messages with the communication interface.

3. The method as claimed in claim 1, wherein notifying the television service provider further includes providing to the television service provider a listing of the identified advertising messages in association with the identifier for the selected television service subscriber via the communication interface.

4. The method as claimed in claim 1, wherein the anonymous television service provider payment card transaction information for the selected television service subscriber is an anonymous identifier assigned by the television service provider and an anonymous purchase date, time and amount.

5. The method as claimed in claim 2, including: periodically updating the modeled purchasing behavior of the selected television service subscriber with the processor; identifying updated television advertising messages that may appeal to the selected television service subscriber based upon the updated modeled purchasing behavior with the processor; and, notifying the television service provider of the updated identified advertising messages via the communication interface.

6. A targeted television advertising system, which comprises:
    a modeling processor configured to model purchasing behavior of a selected television service subscriber using a payment card transaction database;
    an identification processor configured to identify television advertising messages that may appeal to the selected television service subscriber based upon the modeled purchasing behavior;
    wherein the modeling processor is configured to:
    receiving from a television service provider payment card transaction information for the selected television service subscriber via a communication interface;
    searching the payment card transaction database to identify the selected television service subscriber based upon the received transaction information with the processor;
    searching the payment card transaction database for credit card purchase transactions made by the selected television service subscriber with the processor;
    wherein the payment card transaction information received from the television service provider further includes an identifier for the selected television service subscriber and transaction date, time and amount for a purchase of television service; and
    wherein the television service provider payment card transaction information for the selected television service subscriber received from the television service provider is anonymous.

7. The system as claimed in claim 6, including: the communication interface configured to notify the television service provider of the identified advertising messages.

8. The system as claimed in claim 7, wherein the notification to the television service provider further includes a listing of the identified advertising messages in association with the identifier for the selected television service subscriber via the communication interface.

9. The system as claimed in claim 6, wherein the anonymous television service provider payment card transaction information for the selected television service subscriber is an anonymous identifier assigned by the television service provider and an anonymous purchase date, time and amount.

10. The system as claimed in claim 7, wherein: the modeling processor is configured to periodically update the modeled purchasing behavior of the selected television service subscriber with the processor; the identification processor is configured identify updated television advertising messages that may appeal to the selected television service subscriber based upon the updated modeled purchasing behavior; and, the communication interface is configured to notify the television service provider of the updated identified advertising messages via the communication interface.

11. A non-transitory computer-readable storage medium encoded with data and instructions, which when executed by a computing device the instructions causing the computing device to:
- model purchasing behavior of a selected television service subscriber using a payment card transaction database;
- identify television advertising messages that may appeal to the selected television service subscriber based upon the modeled purchasing behavior; and, notify a television service provider of the identified advertising messages;

wherein the instructions causing the computing device to model purchasing behavior of the selected television service subscriber include instructions causing the computing device to:
- receiving from the television service provider payment card transaction information for the selected television service subscriber via a communication interface;
- searching the payment card transaction database to identify the selected television service subscriber based upon the received transaction information with the processor;
- searching the payment card transaction database for credit card purchase transactions made by the selected television service subscriber with the processor;
- wherein the payment card transaction information received from the television service provider further includes an identifier for the selected television service subscriber and transaction date, time and amount for a purchase of television service; and
- wherein the television service provider payment card transaction information for the selected television service subscriber received from the television service provider is anonymous.

* * * * *